(12) United States Patent
Lin et al.

(10) Patent No.: US 8,208,048 B2
(45) Date of Patent: Jun. 26, 2012

(54) METHOD FOR HIGH DYNAMIC RANGE IMAGING

(75) Inventors: Huei-Yung Lin, Chia-Yi (TW); Wei-Zhe Chang, Taoyuan County (TW)

(73) Assignee: National Chung Cheng University, Chia-Yi (TW)

( * ) Notice: Subject to any disclaimer, the term of this patent is extended or adjusted under 35 U.S.C. 154(b) by 392 days.

(21) Appl. No.: 12/453,410

(22) Filed: May 11, 2009

(65) Prior Publication Data

US 2010/0194902 A1 Aug. 5, 2010

(51) Int. Cl.
*H04N 5/262* (2006.01)
*H04N 9/093* (2006.01)

(52) U.S. Cl. ........................................ 348/263; 348/239

(58) Field of Classification Search .................... 348/36, 348/47, 262, 263, 373, 222.1, 239, 362
See application file for complete search history.

(56) References Cited

U.S. PATENT DOCUMENTS

| 6,864,916 | B1 | 3/2005 | Nayar et al. | |
|---|---|---|---|---|
| 7,277,118 | B2 * | 10/2007 | Foote | 348/36 |
| 7,683,950 | B2 * | 3/2010 | Kelly et al. | 348/252 |
| 2007/0077056 | A1 * | 4/2007 | Uchiumi et al. | 396/325 |
| 2008/0024614 | A1 * | 1/2008 | Li et al. | 348/207.99 |
| 2008/0143820 | A1 * | 6/2008 | Peterson | 348/36 |

FOREIGN PATENT DOCUMENTS

TW     I246031     12/2005

* cited by examiner

*Primary Examiner* — Timothy J Henn
(74) *Attorney, Agent, or Firm* — Bacon & Thomas, PLLC

(57) ABSTRACT

A method for high dynamic range imaging includes the steps of arranging at least two cameras parallel and meanwhile capturing a plurality of images of one scene with different exposures by the at least two cameras; adjusting the captured images for the same exposure thereof subject to the response functions of the cameras respectively and then defining a plurality of characteristic spots in each of the images; combining the characteristic spots corresponding to the images respectively to get a displacement of the corresponding characteristic spot in each image and to further get a disparity map; and applying the displacement between the two corresponding characteristic spots in the corresponding images and synthesizing the images to form a synthetic image.

5 Claims, 4 Drawing Sheets

METHOD FOR HIGH DYNAMIC RANGE IMAGING

BACKGROUND OF THE INVENTION

1. Field of the Invention

The present invention relates generally to image processing, and more particularly, to a method for high dynamic range imaging.

The objective of high dynamic range imaging is to capture, represent and display the significant amount of luminance variation of the real-world scenes. This problem commonly arises from the limited dynamic range capability of current imaging devices, compared to the much wider perception range of the human visual system. Since the HDRI is aimed to span a large luminance range for vivid image representation and reproduction, it has many applications on, for example, cinematography, photography, computer graphics and visualization, etc.

In addition to the increasing demand of high quality reproduction of real-world scenes, there is always a need for stereoscopic image representation for the binocular human visual system. The objective is to provide us the depth perception ability using stereo image disparities. Thus, there are many advantages and a large application domain available from combining HDRI with stereo vision. For example, the so-called DIBR (depth image based rendering) can be used to generate the content of 3D TV, video games, augmented reality, or used for advanced video surveillance.

2. Description of the Related Art

The most intuitive way of capturing HDR images is to adopt special light detecting sensors capable of recording images with extended intensity range. However, commercially available HDRI systems are usually very expensive and still only accessible to the professional users. For this reason, many researchers have proposed various HDRI techniques using low-cost imaging devices U.S. Pat. No. 6,864,916 entitled an apparatus and a method for synthesis of high dynamic range imaging disclosed that an image sensor is provided for sequentially capturing multiple images of one scene with different exposures and then combining the multiple images to synthesize a single high dynamic range image.

Taiwan Patent No. I246031 entitled a system and a method for synthesis of images having multiple exposures, based on the above patent, disclosed that an image sensing unit is provided for sensing at least one low dynamic range image, which is the image of the same scene in different exposure time; and an image synthesis unit coupled with the image sensing unit and setting up an exposure history of low dynamic range image for synthesizing the low dynamic image by reference to the exposure history to create a synthetic high dynamic range image. Since each of the low dynamic range images captured by this approach is not done at the same time spot, however, the low dynamic range images are inconsistent with one another to incur afterimage or ghost image in the synthetic high dynamic range image.

SUMMARY OF THE INVENTION

The primary objective of the present invention is to provide a method for high dynamic range imaging and disparity computation, by which a plurality of cameras can capture images with different exposures at the same time spot to synthesize a high dynamic range image and derive the disparity map.

The foregoing objective of the present invention is attained by the method including the steps of arranging at least two cameras side by side and meanwhile capturing a plurality of images of one scene with different exposures; adjusting the captured images for the same exposure thereof subject to the response functions of the cameras and then defining a plurality of characteristic spots in the image; combining the characteristic spots corresponding to the images respectively to get a displacement of the corresponding characteristic spot in each of the images and to further get a disparity map; and applying the displacement between the two corresponding characteristic spots in the corresponding images and synthesizing the images to form a synthetic image.

DETAILED DESCRIPTION OF PREFERRED EMBODIMENTS

Figure 1:
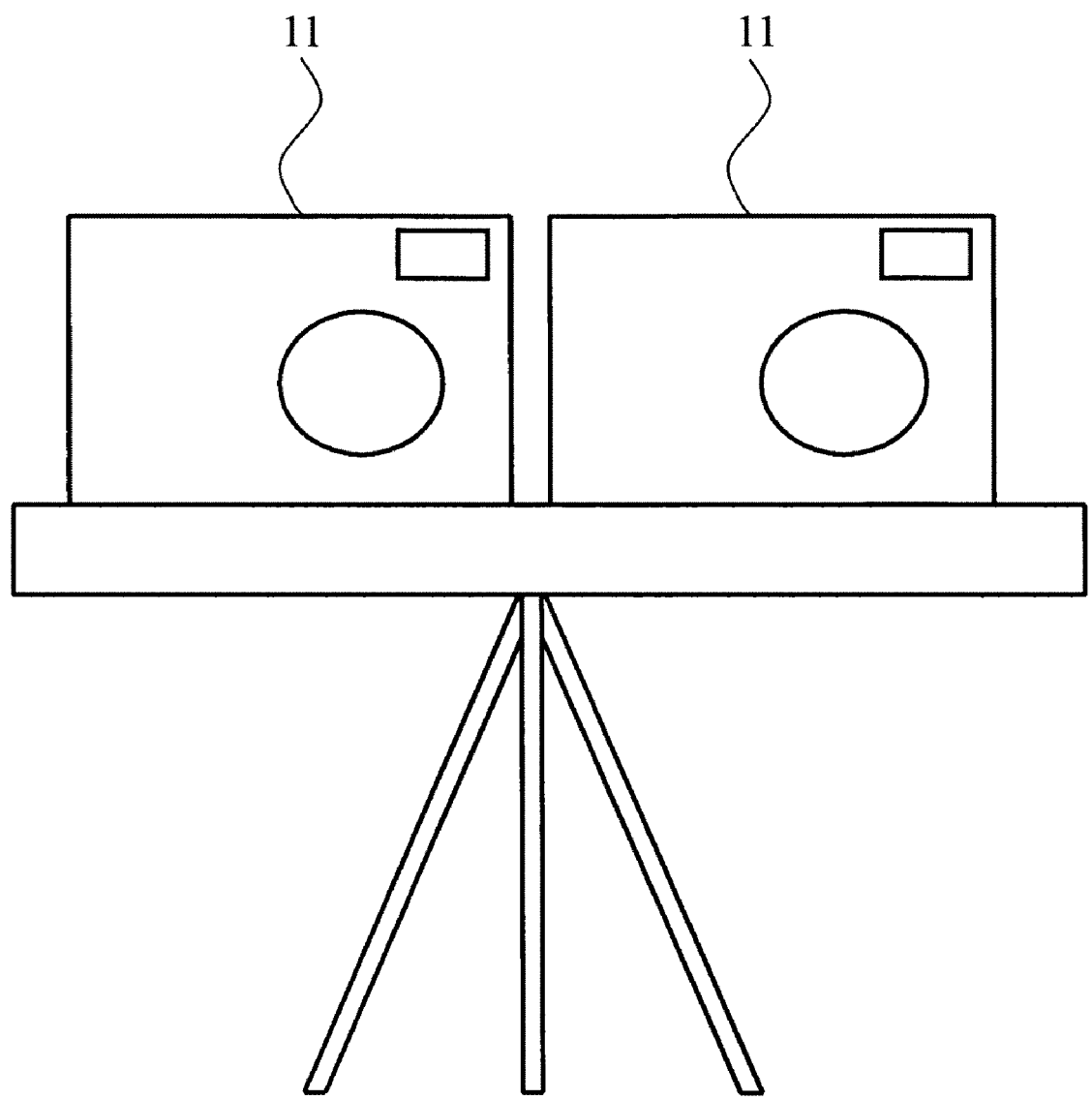
FIG. 1 is a schematic view of two cameras arranged in accordance with a preferred embodiment of the present invention.
Figure 2A:
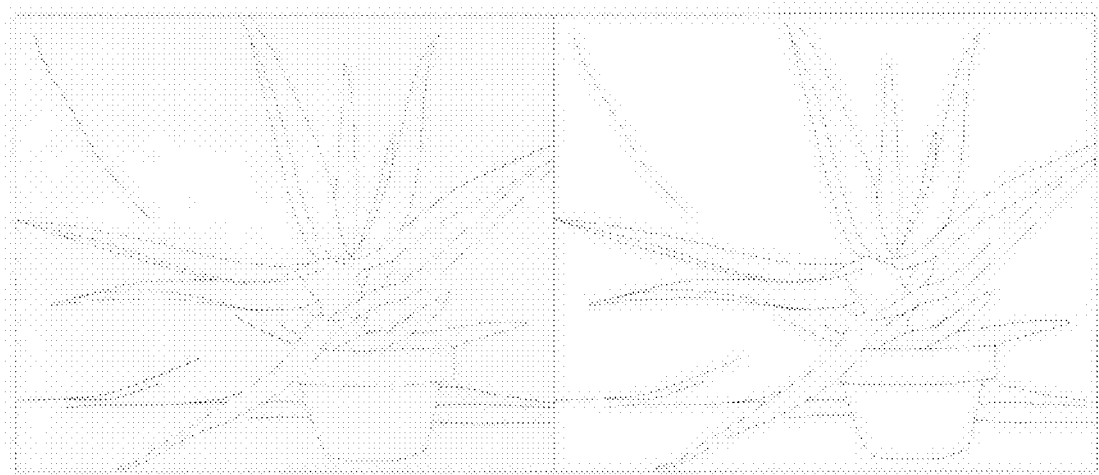
FIG. 2(A) shows drawings of different exposures in accordance with the preferred embodiment of the present invention.
Figure 2B:
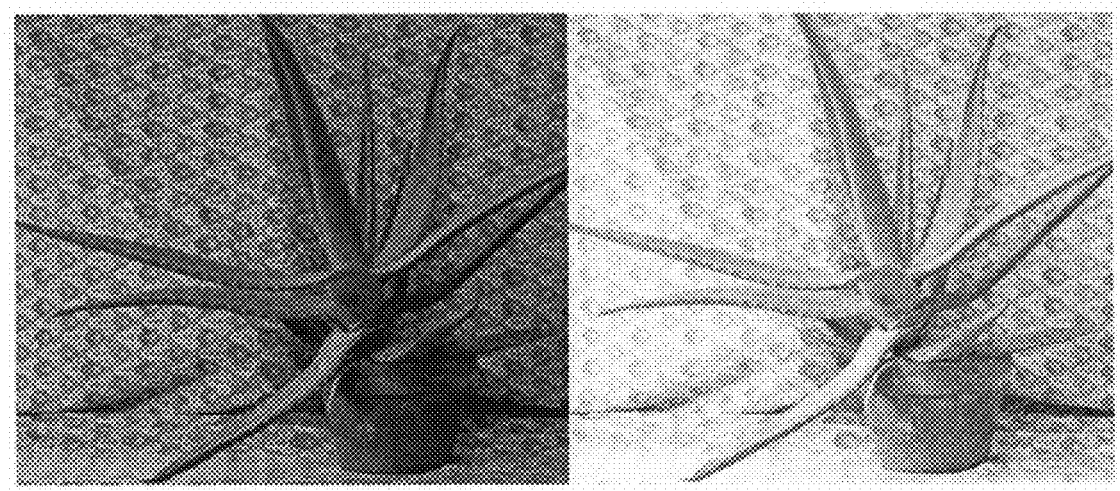
FIG. 2(B) shows images corresponding to the drawings indicated in FIG. 2(A).
Figure 3A:
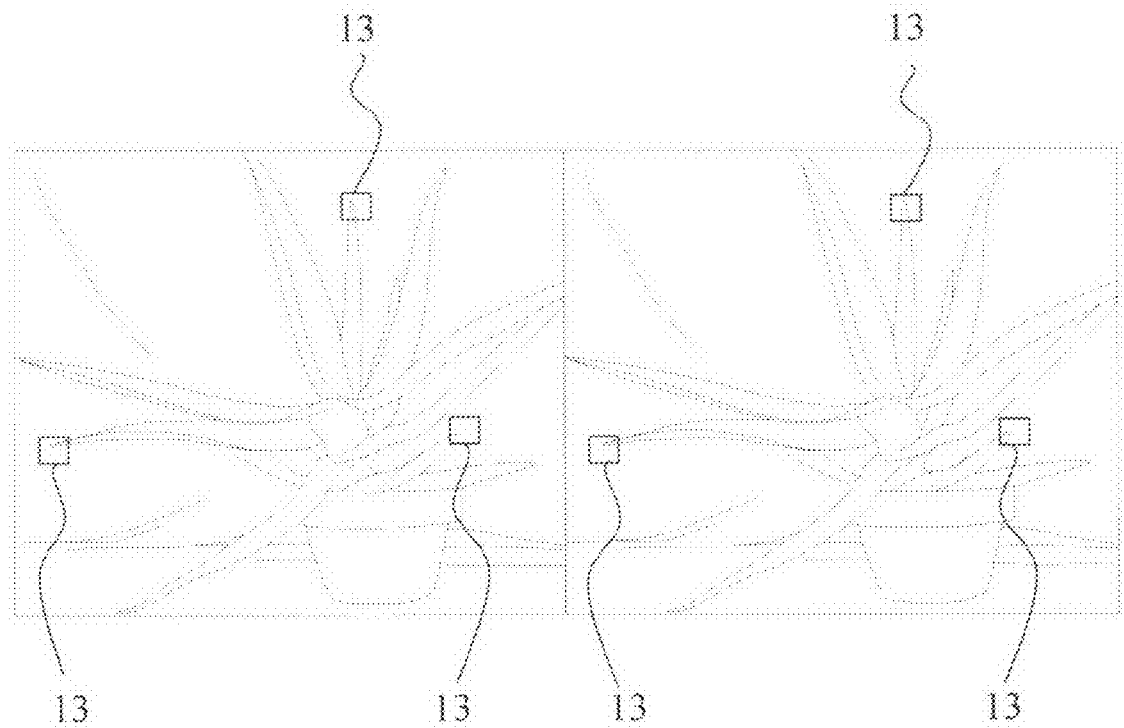
FIG. 3(A) shows drawings of different exposures with markings of characteristic spots in accordance with the preferred embodiment of the present invention.
Figure 3B:
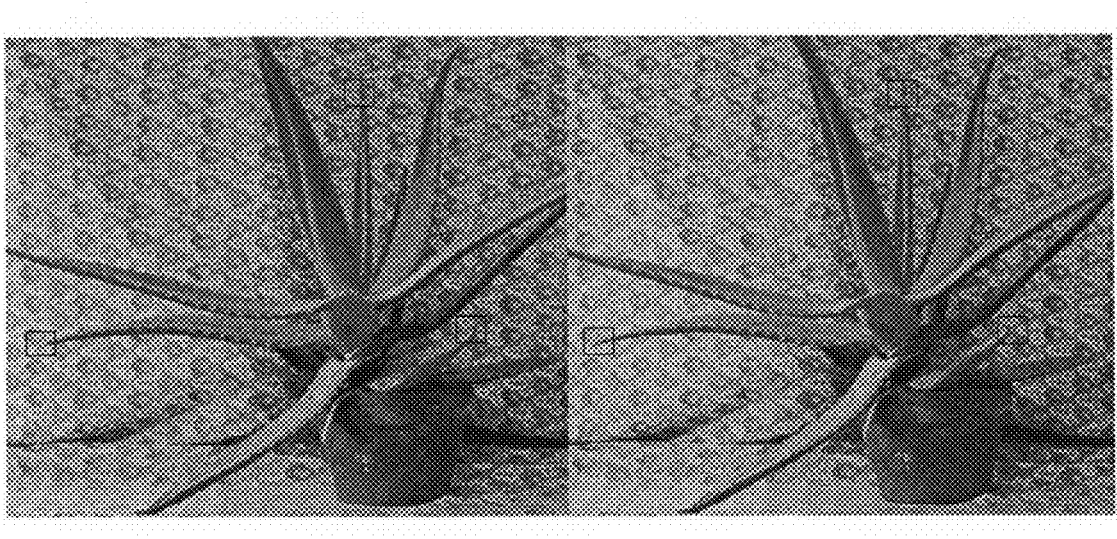
FIG. 3(B) shows images corresponding to the drawings indicated in FIG. 3(A).
Figure 4:
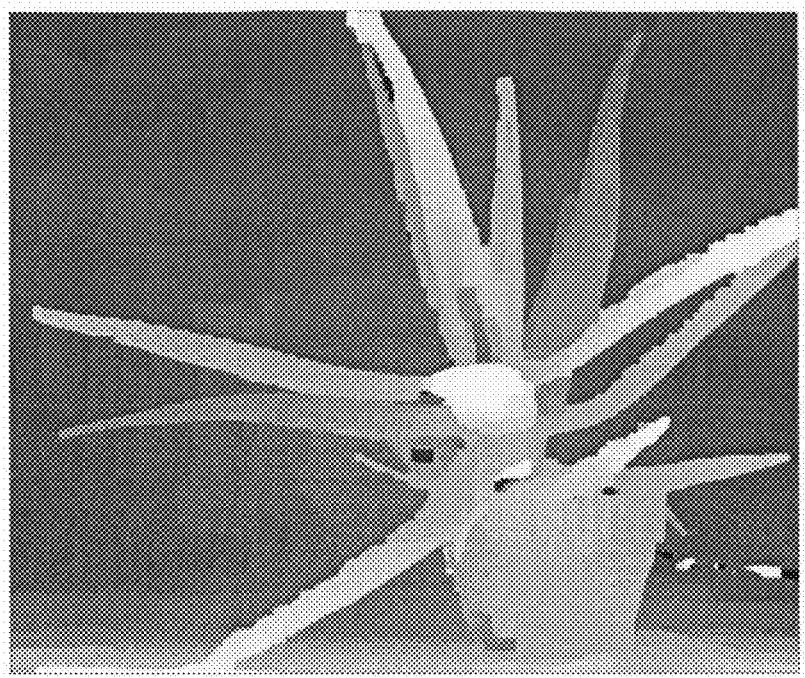
FIG. 4 is a parallax view of image of the preferred embodiment of the present invention.
Figure 5:
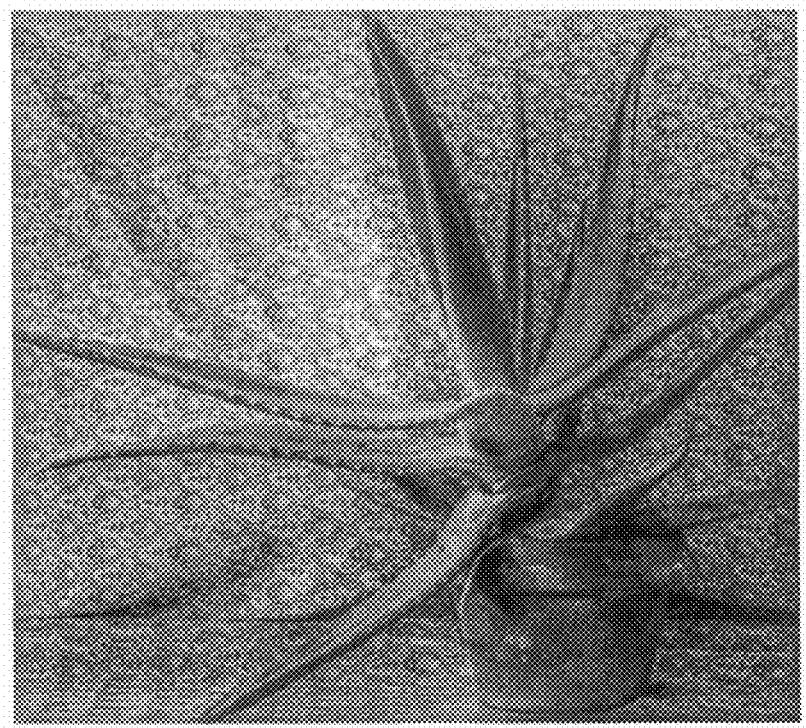
FIG. 5 is a schematic view of synthesis of images in accordance with the preferred embodiment of the present invention.

Referring to FIG. 1, a method for high dynamic range imaging in accordance with a preferred embodiment of the present invention includes the following steps.

a. Arrange two cameras 11 side by side at the same elevation, the two optical axes of the respective two cameras being parallel to each other, and capture images of one scene with different exposures by the two cameras 11, as shown in FIG. 1. The two captured images with different exposures are shown in FIGS. 2(A) and 2(B), the former of which is a drawing and the latter of which is a real image. Each of the cameras 11 includes a corresponding response function. In the step of capturing the images with different exposures, it is done according to different exposure time, i.e. shutter time, in this embodiment. Alternatively, the capture of the images with different exposures can be done subject to different aperture sizes of the camera diaphragm. The response function of the camera is based on the factory default or inferred from the variation of the corresponding spots in different images after the images of the same scene are captured with different exposures at the same time spot. If the cameras are not placed parallel, i.e. their optical axes meet at a finite distance, the images captured by the cameras have to be rectified first. This image rectification process is to make the new images look like they are captured by the parallel cameras. However, such image rectification process belongs to prior art and is not significant in the present invention, such that detailed description in this regard is skipped.

b. Adjust captured images for the same exposure subject to the response functions of the cameras 11 and then define a plurality of characteristic spots 13 in each of the images, as shown in FIGS. 3(A) and 3(B), the former of which is a drawing and the latter of which is a real image. Besides, the depth information of the images is computed based on the response functions of the corresponding cameras to constitute a parallax picture, as shown in FIG. 4.

c. Combine the corresponding characteristic spots 13 to get a displacement between the corresponding two characteristic spots 13 in the corresponding images, further getting a disparity map. Because the two cameras 11 are located at the same elevation, the disparity between the two images is along the horizontal direction.

d. Apply the disparity map and synthesize the images to render a synthetic image shown in FIG. 5. If there is any afterimage or ghost image incurred by synthesis of incorrect characteristic spots 13, it can also be corrected. The synthetic image is a high dynamic range image and can be saved in the file format of high dynamic range image.

In light of the above steps, the present invention includes the following advantages.

1. At least two cameras can capture images with different exposures at the same time spot for immediate synthesis of the high dynamic range image.
2. Correcting the afterimages incurred by the synthesis of the incorrect characteristic spots can avoid the ghost image.
3. The disparity maps associated with the high dynamic range images can be obtained simultaneously.

Although the present invention has been described with respect to a specific preferred embodiment thereof, it is no way limited to the details of the illustrated structures but changes and modifications may be made within the scope of the appended claims.

What is claimed is:

1. A method for high dynamic range imaging, comprising steps of:
    a) operating at least two cameras to capture at least two respective images of a scene with different exposures, wherein each of the at least two cameras has its corresponding camera exposure response function;
    b) adjusting the captured images to a same exposure according to the exposure response function of the corresponding camera and defining a plurality of characteristic spots in each of the images;
    c) combining the characteristic spots corresponding to the images to get a disparity map of the characteristic spots; and
    d) applying the disparity map and combing the images to form a synthetic image.

2. The method as defined in claim 1, wherein the images with different exposures in the step a) are captured according to different exposure time.

3. The method as defined in claim 1, wherein the images with different exposures in the step a) are captured according to different aperture sizes.

4. The method as defined in claim 1, wherein the at least two cameras in the step a) are arranged at the same elevation.

5. The method as defined in claim 1, wherein the at least two cameras in the step a) are arranged in parallel.

\* \* \* \* \*